US009662944B2

(12) United States Patent
Hinque et al.

(10) Patent No.: US 9,662,944 B2
(45) Date of Patent: *May 30, 2017

(54) SELF INFLATING TIRE WITH PRESSURE REGULATOR

(71) Applicant: The Goodyear Tire & Rubber Company, Akron, OH (US)

(72) Inventors: Daniel Paul Luc Marie Hinque, Habay-la-Neuve (BE); Anne Therese Peronnet-Paquin, Luxembourg (LU); Gilles Bonnet, Niederfeulen (LU); Gauthier Piret, Ster-Francorchamps (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 289 days.

This patent is subject to a terminal disclaimer.

(21) Appl. No.: 14/546,410

(22) Filed: Nov. 18, 2014

(65) Prior Publication Data

US 2015/0174973 A1    Jun. 25, 2015

Related U.S. Application Data

(60) Provisional application No. 61/920,047, filed on Dec. 23, 2013.

(51) Int. Cl.
*B60C 23/12* (2006.01)
*B60C 5/12* (2006.01)
*B60C 19/00* (2006.01)

(52) U.S. Cl.
CPC ............... *B60C 23/12* (2013.01); *B60C 5/12* (2013.01); *B60C 19/00* (2013.01); *Y10T 152/10495* (2015.01)

(58) Field of Classification Search
CPC .................................. B60C 23/10; B60C 23/12
USPC ........................................ 152/419, 423–426
See application file for complete search history.

(56) References Cited

U.S. PATENT DOCUMENTS

| 638,628 A | 12/1899 | Everett et al. |
| 1,050,886 A | 1/1913 | Wetherell |
| 1,134,361 A | 4/1915 | Wetherell |
| 9,365,084 B2 * | 6/2016 | Hinque .................. B60C 23/12 |

(Continued)

FOREIGN PATENT DOCUMENTS

| DE | 3433318 A1 | 3/1986 |
| DE | 3711785 A1 | 10/1988 |

(Continued)

OTHER PUBLICATIONS

European Search Report for Application Serial No. EP14197863 dated Jun. 25, 2015.

*Primary Examiner* — Jason Bellinger
(74) *Attorney, Agent, or Firm* — June E. Rickey

(57) ABSTRACT

A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to a regulator device. The regulator device regulates the inlet air flow to the air tube and the outlet air flow to the tire cavity.

13 Claims, 5 Drawing Sheets

(56) References Cited

U.S. PATENT DOCUMENTS

| | | |
|---|---|---|
| 2004/0112495 A1 | 6/2004 | Weise |
| 2006/0118224 A1 | 6/2006 | Ellmann |
| 2007/0017615 A1 | 1/2007 | Nobuchika et al. |
| 2009/0294006 A1 | 12/2009 | Hrabal |
| 2010/0243121 A1 | 9/2010 | Eigenbrode |
| 2011/0120611 A1 | 5/2011 | Hansen |
| 2011/0146867 A1 | 6/2011 | Benedict |
| 2011/0146868 A1 | 6/2011 | Losey et al. |
| 2012/0073716 A1 | 3/2012 | Benedict |
| 2012/0090766 A1 | 4/2012 | Hinque et al. |
| 2012/0125504 A1 | 5/2012 | Delgado et al. |
| 2012/0125510 A1 | 5/2012 | Delgado et al. |
| 2012/0160386 A1 | 6/2012 | Hinque et al. |
| 2013/0048176 A1 | 2/2013 | Hinque |
| 2013/0048177 A1 | 2/2013 | Hinque |
| 2013/0048178 A1 | 2/2013 | Hinque |
| 2013/0112328 A1 | 5/2013 | Hinque et al. |
| 2013/0112329 A1 | 5/2013 | Hinque et al. |
| 2014/0000778 A1 | 1/2014 | Gobinath |
| 2014/0020805 A1 | 1/2014 | Gobinath et al. |
| 2014/0102621 A1 | 4/2014 | Losey |
| 2014/0110029 A1 | 4/2014 | Benedict et al. |
| 2014/0158266 A1 | 6/2014 | Hinque |
| 2014/0174619 A1 | 6/2014 | Hinque |
| 2014/0174620 A1 | 6/2014 | Hinque |
| 2014/0174621 A1 | 6/2014 | Hinque et al. |
| 2014/0174622 A1 | 6/2014 | Hinque |
| 2015/0059951 A1 | 3/2015 | Hinque |
| 2015/0122390 A1 | 5/2015 | Durr |
| 2015/0122391 A1 | 5/2015 | Hinque et al. |
| 2015/0158348 A1 | 6/2015 | Hinque |
| 2015/0158350 A1 | 6/2015 | Hinque et al. |
| 2015/0158351 A1 | 6/2015 | Hinque |
| 2015/0158353 A1 | 6/2015 | Hinque et al. |
| 2015/0165839 A1 | 6/2015 | Hinque et al. |
| 2015/0165840 A1* | 6/2015 | Hinque .................. B60C 23/12 152/450 |
| 2015/0165841 A1* | 6/2015 | Hinque .................. B60C 23/12 152/450 |

FOREIGN PATENT DOCUMENTS

| | | |
|---|---|---|
| DE | 3881591 T2 | 1/1989 |
| DE | 4323835 A1 | 1/1995 |
| DE | 102005031099 A1 | 1/2007 |
| DE | 102007018437 A1 | 12/2007 |
| EP | 1604842 A1 | 12/2005 |
| EP | 2565060 A1 | 3/2013 |
| EP | 2746072 A1 | 6/2014 |
| EP | 2881269 A1 | 6/2015 |
| FR | 2318747 | 2/1977 |
| SE | 183890 | 5/1963 |

* cited by examiner

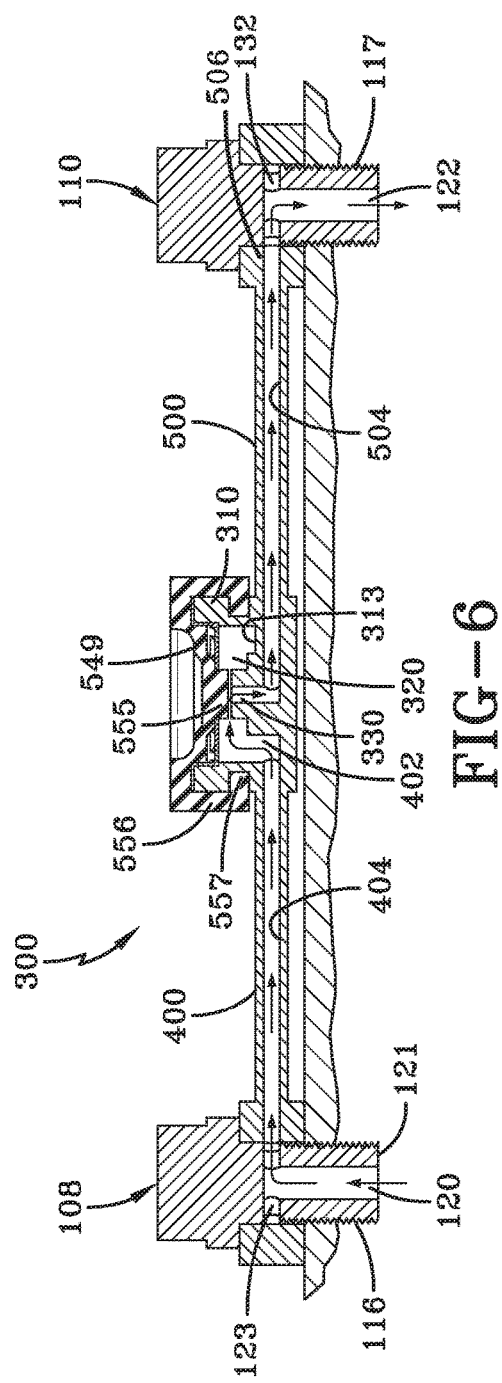
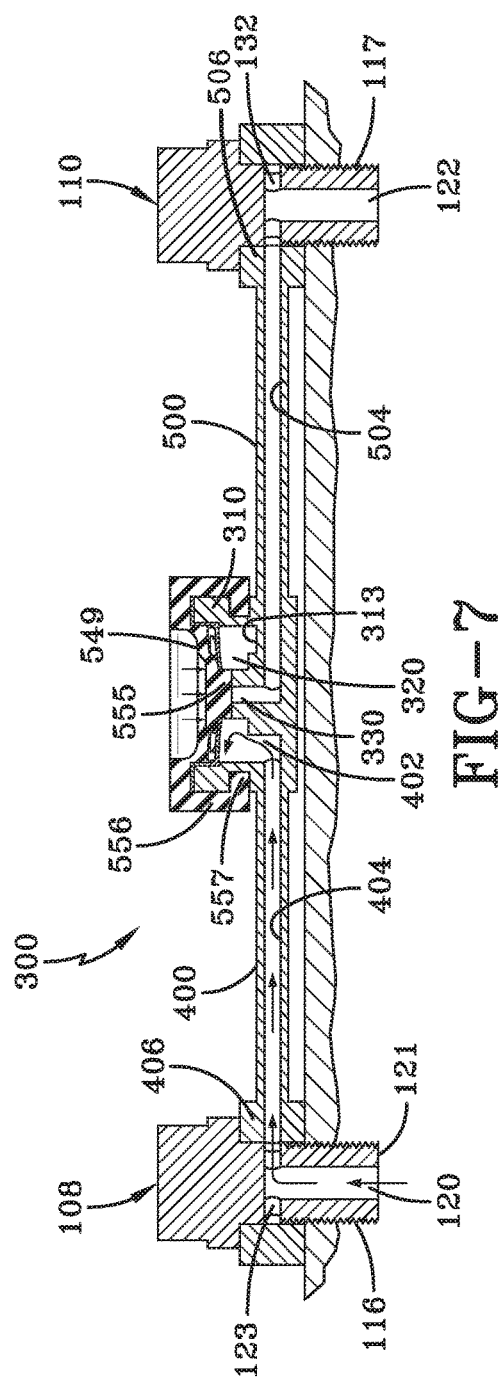

SELF INFLATING TIRE WITH PRESSURE REGULATOR

FIELD OF THE INVENTION

The invention relates generally to self-inflating tires and, more specifically, to a pump mechanism and pressure regulator for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect a self-inflating tire assembly, including a tire mounted to a rim, the tire having a tire cavity, first and second sidewalls extending respectively from first and second tire bead regions to a tire tread region; an air passageway having an inlet end and an outlet end, the air passageway being composed of a flexible material operative to open and close when the tire rotates, wherein the outlet end is in fluid communication with the tire cavity; the regulator device having a regulator body having an interior chamber; a pressure membrane being mounted on the regulator device to enclose the interior chamber, wherein the pressure membrane has a lower surface that is positioned to open and close the outlet port mounted in the interior chamber, wherein the pressure membrane is in fluid communication with the tire cavity pressure; wherein the body of the regulator device has a first and second flexible duct, wherein said first and second flexible ducts each have an internal passageway; wherein the first flexible duct has a first end in fluid communication with the outside air, and a second end is connected to the interior chamber of the regulator device, wherein the second flexible duct has a first end connected to the outlet port of the regulator device, and a second end in fluid communication with the inlet end of the air passageway.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of a surface, perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 6 is a cross-sectional view of the pressure regulator assembly of FIG. 5 shown in the open position;

FIG. 7 is a cross-sectional view of the pressure regulator assembly of FIG. 5 shown in the closed position;

DETAILED DESCRIPTION OF THE INVENTION

Figure 1:
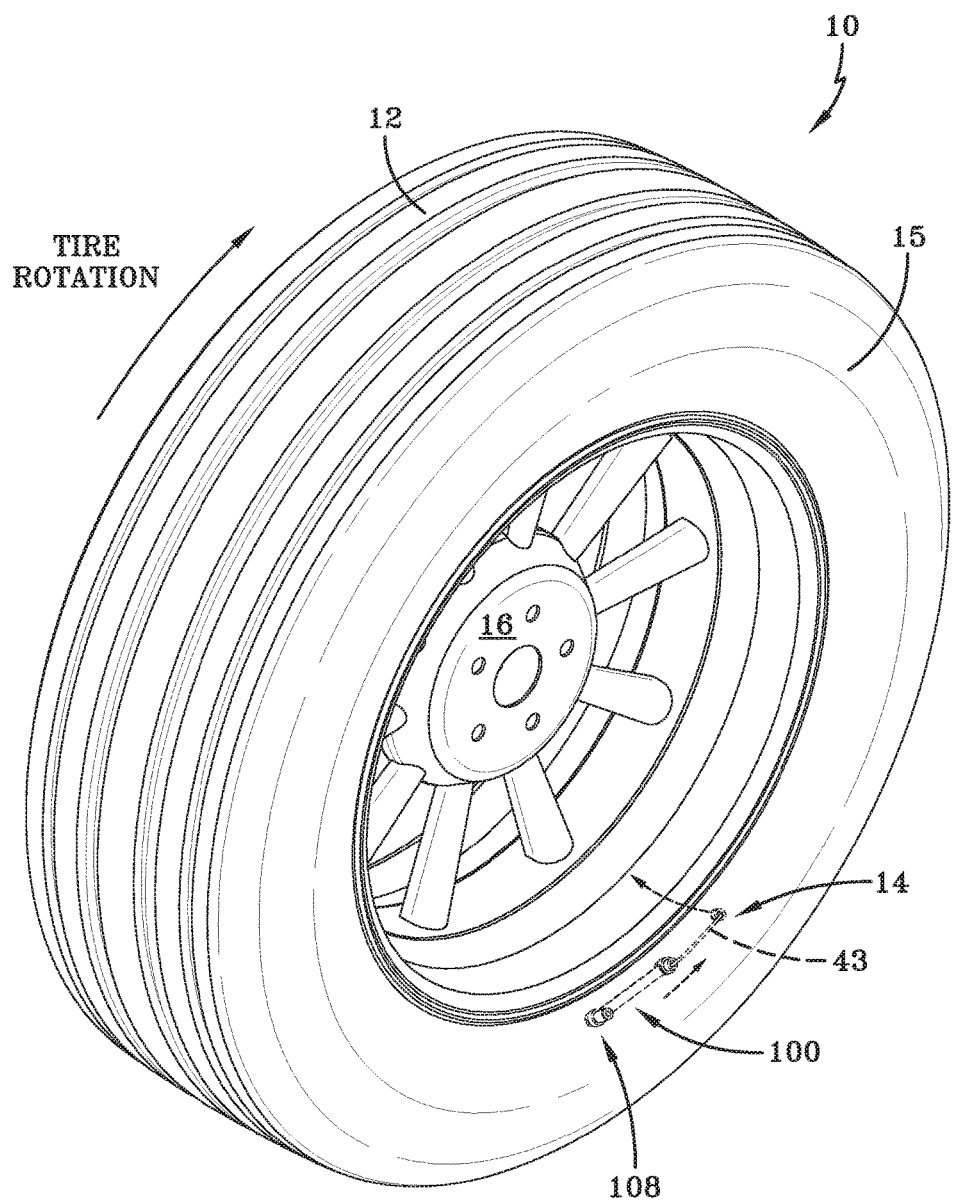
FIG. 1 is an isometric view of tire and rim assembly showing a pump assembly.
Figure 2:
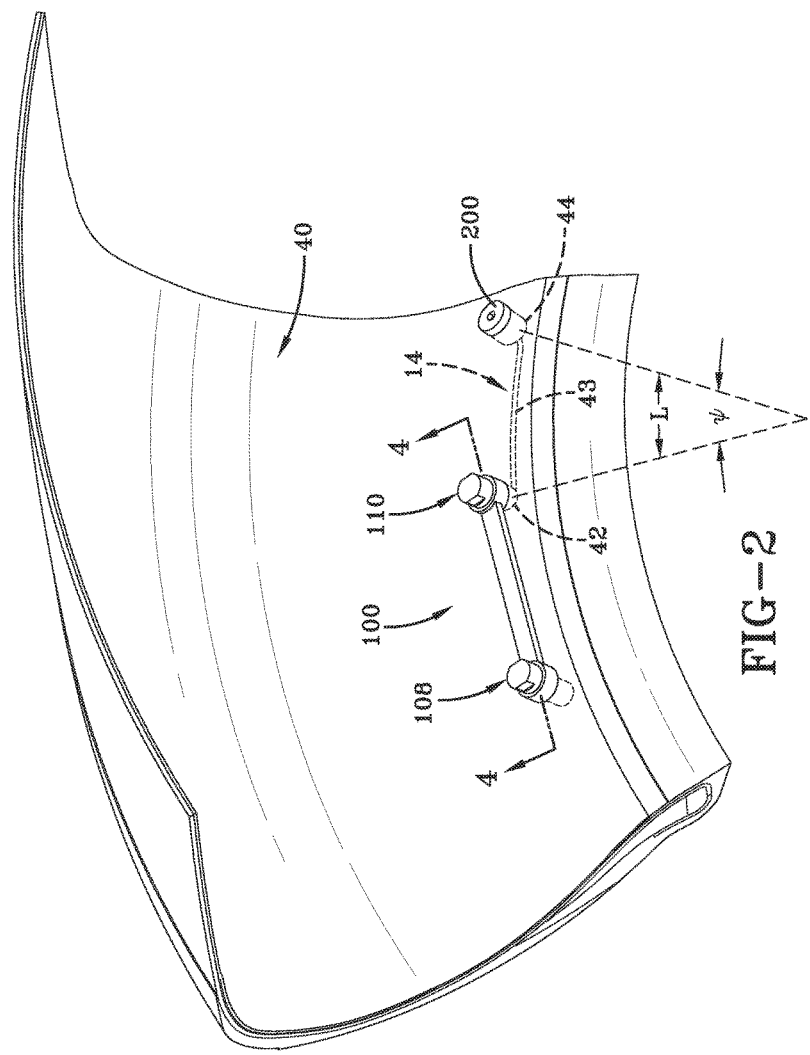
FIG. 2 is a front view of the pump assembly as shown from inside the tire of FIG. 1.

Referring to FIGS. 1 and 2, a tire assembly 10 includes a tire 12, a pump assembly 14, and a wheel 16. The tire and rim enclose a tire cavity 40. As shown in FIGS. 1-2, the pump assembly 14 is preferably mounted into the sidewall area 15 of the tire, preferably near the bead region.

Pump Assembly 14

As shown in FIG. 2, the pump assembly 14 includes an air passageway 43 which may be molded into the sidewall of the tire during vulcanization or formed post cure. When the air passageway is molded into the tire sidewall as shown in FIG. 2, the air passageway has an arc length L as measured by an angle Ψ that is measured from the center of rotation of the tire. In a first embodiment, the angle Ψ may range, and is preferably in the range of about 15-50 degrees or optionally, an angular length sufficient to extend the length of the tire footprint. The air passageway has an arc length L that may extend in a circumferential direction, or any direction. The arc length L may range, and is preferably about the length of the tire footprint. The length is typically about 20-40 degrees when the shorter length is used. Alternatively, the pump tube length may be any desired length, typically 20 degrees or more. The pump air passageway 43 is comprised of a tube body formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized. The tube may be a discrete tube that is inserted into the tire during tire manufacturing, or the tube may be molded into shape by the presence of a removable strip that forms the passageway when removed.

As shown in FIG. 2, the pump passageway 43 is connected to a flow bridge 100, which is described in more detail, below. The inlet end 42 of the passageway 43 is connected to a first flow tee 110 of the flow bridge 100, and an outlet end 44 of the pump passageway is connected to an outlet valve 200. The outlet valve 200 is in fluid communication with the tire cavity 40, and prevents back flow of cavity air into the pump system 14. The outlet valve 200 may be any conventional check valve known to those skilled in the art.

Flow Bridge 100

The flow bridge 100 ports fluid from one location to another. As shown in FIG. 2, the flow bridge can port fluid from the outside air to the inlet of the pump passageway 42. The flow bridge may also be used to port fluid from the exit of the pump to the check valve. The use of the flow bridge is not limited to the above examples, and may be used to port fluid from one location to another. The flow bridge 100 is formed of a flexible material, and has a first end 102 and a second end 104. The flow bridge 100 is secured to the tire by first and second flow tees which are inserted through the first and second ends 102,104. An internal passageway 106 extends from the first end 102 to the second end 106. The first end 102 and the second end 106 each terminate in a flanged annular collar 107,109. A first flow tee 108 and a second flow tee 110 is received through the hole of the respective annular collar 107,109. The first flow tee 108 and the second flow tee 110 each have a respective enlarged head 111,113. The first flow tee 108 and the second flow tee 110 each have a respective cylindrical body 115,117 having a respective outer threaded surface 116,118. The first flow tee 108 and the second flow tee 100 may be screwed into a threaded internal bore of a cylindrical sleeve (not shown). Each sleeve is permanently inserted into the tire, preferably in the tire sidewall. Each flow tee 108,110 has a central duct 120,122. The duct 120 of the first flow tee 108 has a first end 121 in fluid communication with the outside air (not shown). The duct 120 has opposed outlet holes 123 in fluid communication with the inlet of the internal passageway 106 of the flow bridge 100. Surrounding the outlet holes 123 is a recessed ring 125. The duct 122 of the second flow tee 110 has a first end 130 connected to the inlet 42 of the pump passageway 43. The duct 122 of the second flow tee 110 has a second end having opposed inlet holes 132. Surrounding the opposed inlet holes 132 is a recessed ring 134. Each recessed ring 125,134 facilitates flow from/to the opposed holes 123,132 to/from the internal passageway 106 of the flow bridge.

Regulator Device

Figure 3:
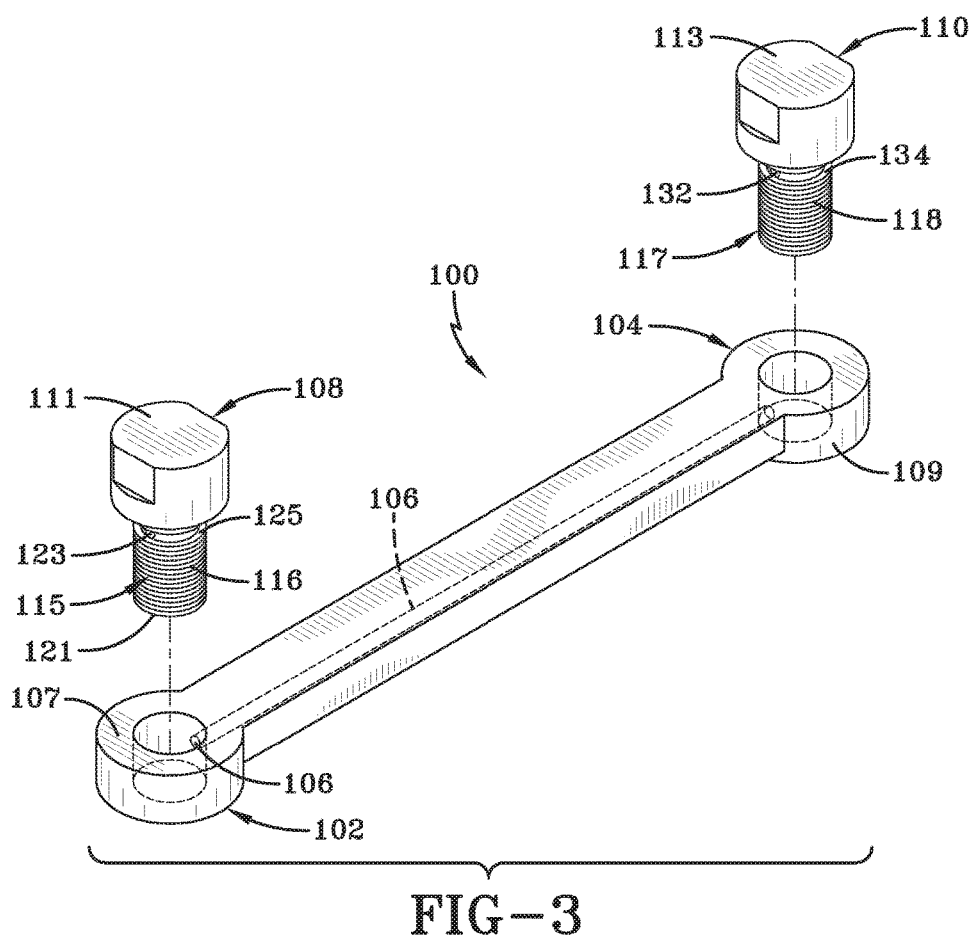
FIG. 3 is a perspective view of a flow bridge assembly.
Figure 4:
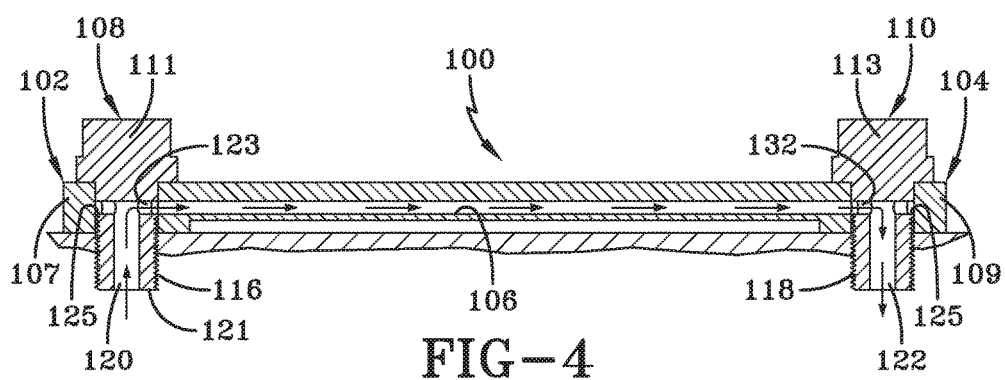
FIG. 4 is a cross-sectional view of the flow bridge assembly of FIG. 4.
Figure 5:
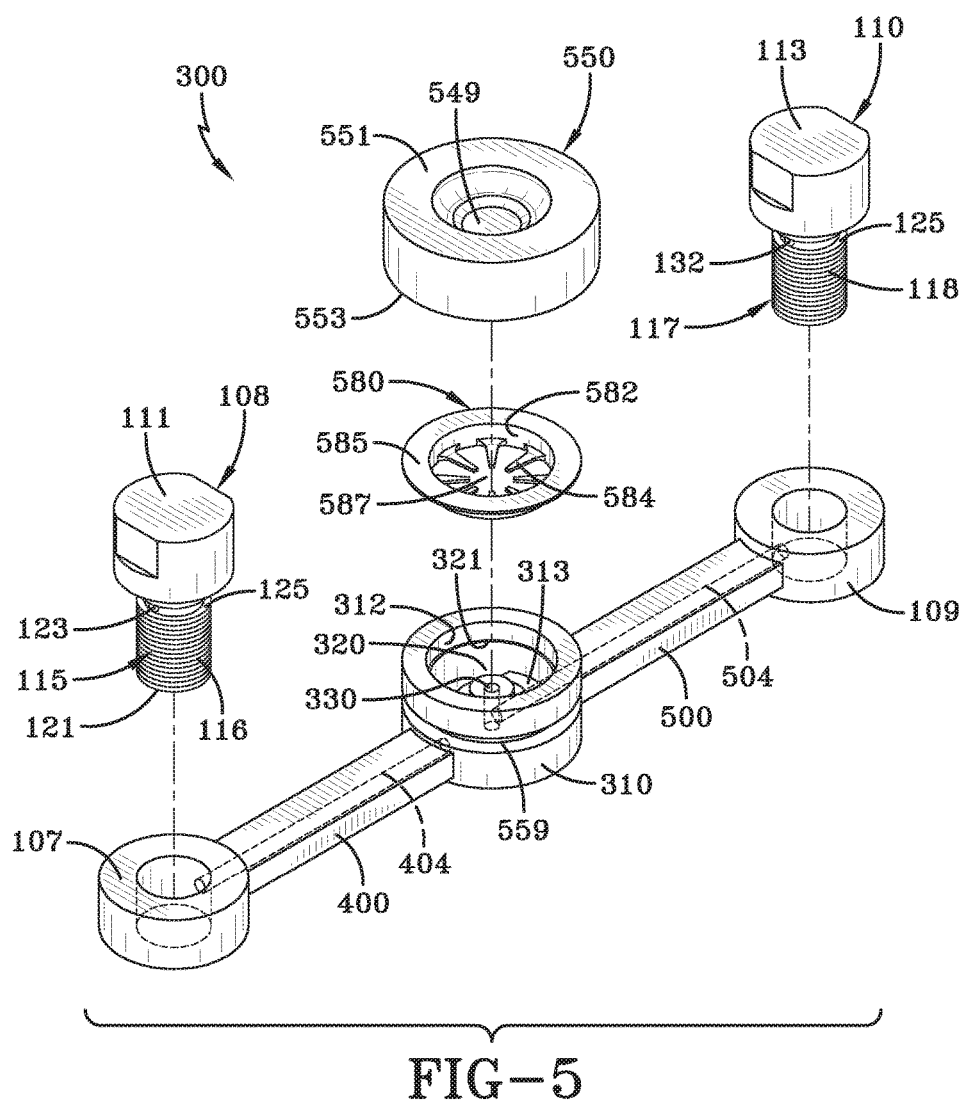
FIG. 5 is a perspective view of a pressure regulator assembly.

The flow bridge 100 may further include a valve mechanism to regulate the flow to the pump. The flow bridge 100 shown in FIG. 2 may be replaced with the regulator device 300 shown in FIGS. 3-5. The regulator device 300 functions to regulate the flow of air to the pump 14. The regulator device 300 has a central regulator housing 310 that houses an interior chamber 320. The interior chamber 320 has a central opening 312. Opposite the central opening 312 is an outlet port 330. The outlet port is raised from the bottom surface 313 and extends into the interior of the chamber 320. The outlet port is positioned to engage a pressure membrane 550.

The pressure membrane has an upper surface 551 that has an inner depression 549. The pressure membrane has a lower surface 553 wherein a plug 555 extends from the lower surface. The pressure membrane further has an annular sidewall 556 which extends downwardly from the upper surface, forming a lip 557. The lip 557 is preferably annular, and snaps in an annular cutout 559 formed on the outer regulator housing 310. The pressure membrane is a disk shaped member made of a flexible material such as, but not limited to, rubber, elastomer, plastic or silicone. The outer surface 551 of the pressure membrane is in fluid communication with the pressure of the tire chamber 40. The lower surface 553 of the pressure membrane is in fluid communication with the interior chamber 320. The plug 555 is positioned to close the outlet port 330. A leaf spring 580 is positioned in the interior chamber 320 to bias the pressure membrane 550 in the open position. The spring has an inner surface 582 wherein a plurality of extensions 584 extend radially inward. The spring has an outer annular rim 585 that is received in an annular recess 321. The leaf spring has an inner hole 587 for receiving the pressure membrane plug 555. The balance of pressure forces on each side of the pressure membrane actuates the pressure membrane plug 555 to open and close the outlet port 330.

Extending from the central regulator housing 310 is a first and second flexible duct 400, 500, positioned on either side of the central regulator housing 310. Each flexible duct 400, 500 may be integrally formed with the regulator housing as shown, or be a discrete part connected to the central regulator housing 310. Each flexible duct 400, 500 has an internal passageway 404, 504 for communicating fluid.

The internal passageway 404 of the first flexible duct 400 has a first opening 402 that opens to the inside the interior chamber 320. The internal passageway 404 of the first flexible duct 400 has a second end 406 that is in fluid communication with the internal duct 120 of the first flow tee 108. Outside air is communicated through the internal duct 120 of the first flow tee 108 to the inlet 406 of the internal passageway 404 of the first flexible duct 400.

The internal passageway 504 of the second flexible duct 500 is shown integrally formed with the outlet port 330 of the interior chamber 320. The internal passageway 504 has a second end 506 in fluid communication with the internal duct 122 of the T fitting 110. Flow from the internal duct 122 is communicated to the inlet 42 of the pump passageway 43.

System Operation

As will be appreciated from FIG. 2, the regulator device 300 is in fluid communication with the inlet end of the pump passageway 43. As the tire rotates, a footprint is formed against the ground surface. A compressive force is directed into the tire from the footprint and acts to flatten the pump passageway 43. Flattening of the pump passageway 43 forces the compressed air towards the pump outlet check valve 200. The pumped air exits the pump outlet check valve into the tire cavity 40.

The regulator device 300 controls the flow of outside air into the pump. If the tire pressure is low, the membrane 550 in the regulator device 300 is responsive to the tire pressure in the tire cavity 40. If the tire cavity pressure falls below a preset threshold value, the plug of the membrane will unseat from the central outlet port 330. Outside air will enter the first tee fitting 108 and then into the internal passageway of the first flexible duct 400, as shown in FIG. 6. The flow then exits the first flexible duct and enters the regulator chamber and then into the second flexible duct, through the T fitting 110 and then into the pump inlet. The flow is then compressed through the pump and then exits the pump outlet valve into the tire cavity. The pump will pump air with each tire rotation. The pump passageway 43 fills with air when the pump system is not in the footprint.

If the tire pressure is sufficient, the regulator device will block flow from exiting the pressure regulator, as shown in FIG. 7. The pressure membrane is responsive to the cavity tire pressure and engages the central port 330 forming a seal which prevents air flow from passing through the regulator device. The pressure membrane material properties are adjusted to have the desired tire pressure settings.

The location of the pump assembly in the tire will be understood from FIG. 1. In one embodiment, the pump assembly 14 is positioned in the tire sidewall, radially outward of the rim flange surface, typically in the chafer. The positioning of the pump assembly may be located at any region of the tire that undergoes cyclical compression. So positioned, the air passageway 43 is radially inward from the tire footprint and is thus positioned to be flattened by forces directed from the tire footprint as described above. The cross-sectional shape of the air passageway 43 may be elliptical or round.

As described above, the length L of the pump passageway may be about the size of the tire's footprint length Z. However, the invention is not limited to same, and may be shorter or longer as desired. As the length of the pump increases, the pump passageway will need to substantially open and close like a peristaltic pump.

The pump assembly 14 may also be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
   a tire mounted to a rim, the tire having a tire cavity, first and second sidewalls extending respectively from first and second tire bead regions to a tire tread region;
   a pump passageway having an inlet end and an outlet end, the pump passageway being composed of a flexible material operative to open and close when the tire rotates, wherein the outlet end is in fluid communication with the tire cavity;
   a flow bridge comprised of a flexible material, and having an internal passageway which extends completely therethrough, said internal passageway having a first end and a second end;
   a first flow tee having a first internal duct and having an outlet in fluid communication with the first end of the flow bridge, said first internal duct having in inlet in fluid communication with the outside air;
   a second flow tee having a second internal duct and having an inlet in fluid communication with the second end of the flow bridge, said second internal duct having an outlet in fluid communication with the inlet end of the pump passageway.

2. The self-inflating tire assembly of claim 1 wherein the pump passageway is integrally formed in the sidewall of the tire.

3. The self-inflating tire assembly of claim 1 wherein the first flow tee has a filter.

4. The self-inflating tire assembly of claim 1, wherein the length of the pump passageway is greater than 10 degrees.

5. The self-inflating tire assembly of claim 1, wherein the length of the pump passageway is the same as the length of the tire footprint.

6. The self-inflating tire assembly of claim 1, wherein the length of the pump passageway is in the range of 10 to 30 degrees.

7. The self-inflating tire assembly of claim 1, wherein the pump passageway is substantially of elliptical in cross-section.

8. The self-inflating tire assembly of claim 1, wherein the pump passageway is positioned in a chafer.

9. The self-inflating tire assembly of claim 1, wherein the pump passageway is positioned between a tire bead region and the rim tire mounting surface radially inward of the tire tread region.

10. The self-inflating tire assembly of claim 1, wherein a first check valve is located between the outlet of the pump passageway and the tire cavity.

11. The self-inflating tire assembly of claim 1, wherein a second check valve is located between the inlet of the pump passageway and the outlet of the regulator.

12. The self-inflating tire assembly of claim 11 wherein the second check valve is mounted to the tire.

13. The self-inflating tire assembly of claim 1 wherein the first flow tee is mounted into an insert sleeve affixed to the tire sidewall, wherein the insert sleeve has an internally threaded bore that extends completely therethrough, wherein the internal bore has a first end open to the outside air.

\* \* \* \* \*